May 31, 1932.   B. GALLSWORTHY   1,860,890
DISTILLING MATERIALS IN CONTACT WITH POROUS SUBSTANCES
Filed Oct. 5, 1923   2 Sheets-Sheet 1
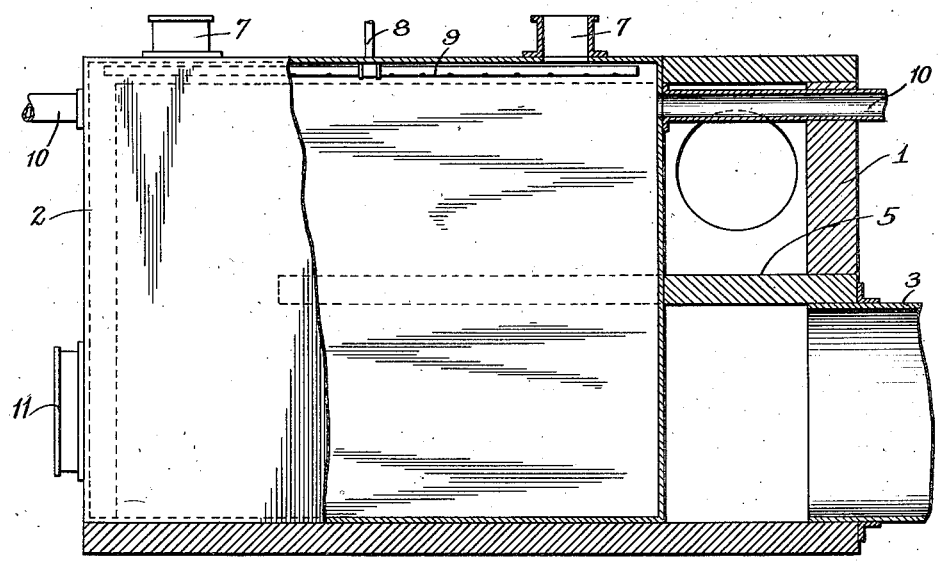
Fig.1,
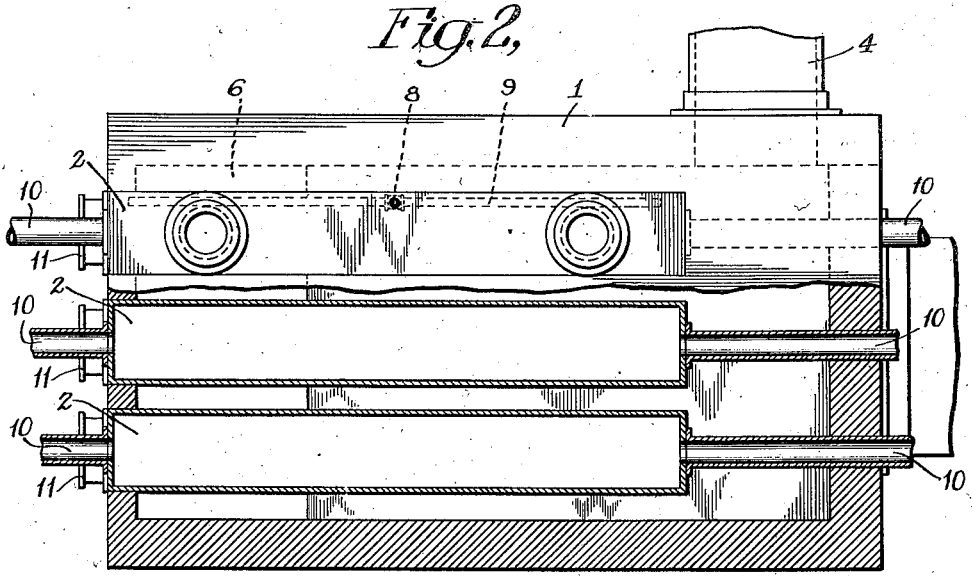
Fig.2,
Inventor
Benjamin Gallsworthy
By his Attorney

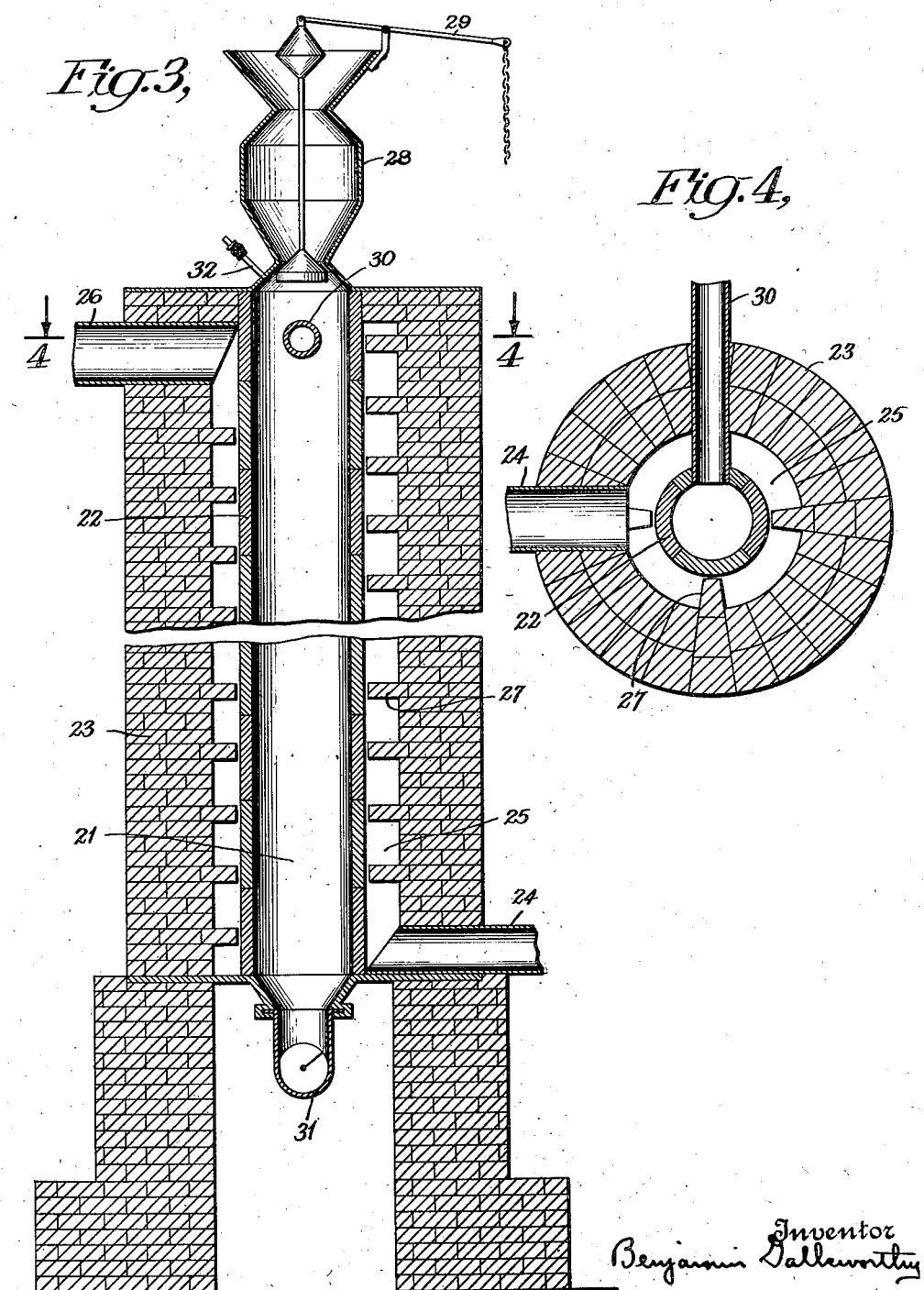

Patented May 31, 1932

1,860,890

UNITED STATES PATENT OFFICE

BENJAMIN GALLSWORTHY, OF BAYONNE, NEW JERSEY, ASSIGNOR, BY MESNE ASSIGNMENTS, TO THE TEXAS COMPANY, OF NEW YORK, N. Y., A CORPORATION OF DELAWARE

DISTILLING MATERIALS IN CONTACT WITH POROUS SUBSTANCES

Application filed October 5, 1923. Serial No. 666,710.

Broadly and generally my invention relates to the heating of acid sludge or pitch derived therefrom, or mixtures of acid sludge or pitch and crude petroleum or derivatives thereof in the presence of porous materials similar in a way to the invention disclosed in my application Serial No. 336,425, filed Nov. 7, 1919, allowed May 23, 1923, now Patent No. 1,477,642, dated December 18, 1923 of which this application is a continuation in part. More specifically, my invention pertains to the dehydration of emulsions by distilling them in contact with porous substances and also to the impregnating of certain carbonaceous substances, such as lignite, with bituminous residues.

Some kinds of low grade petroleum, particularly the asphaltic crudes of Mexico and California, are so heavily impregnated with moisture that it has hitherto been found impracticable to effect a separation of the water from the mixture so that the oil could be distilled and refined. Acid sludge resulting from the treatment of petroleum with sulphuric acid has quite generally presented a problem to refiners as no practical use could be made of it, and it has been difficult to dispose of it because of its acid content. According to my invention either acid sludge alone or a mixture of sludge and crude petroleum can be used to advantage by distilling it in contact with such substances as lignite, peat, brown coal or coke, whereby the water and acid contents are driven off and the bituminous residue impregnates the porous substance, thereby rendering it suitable for fuel.

From the foregoing it is apparent that one object of my invention is to so treat porous substances such as lignite, with acid sludge or a mixture of sludge and crude petroleum as to render the porous substance suitable as a fuel.

Another object of my invention is to dehydrate acid sludge or mixture of acid sludge and crude petroleum.

Other objects and advantages will appear as the description proceeds.

In the accompanying drawings, I have illustrated apparatus adapted for use in carrying out certain features of my invention.

Figure 1 is a partially sectional elevation of an apparatus comprising a plurality of retorts in a heating chamber and designed for carrying out certain features of my invention.

Figure 2 is a plan view with the walls partially broken away and shown in section, of the apparatus shown in Figure 1.

Figure 3 is a vertical section of a modified apparatus designed for carrying out another feature of my invention.

Figure 4 is a sectional plan view taken on the line 4—4 of Figure 3.

With these and other objects in view my process comprises first heating a quantity of porous material or a material which becomes porous on the application of heat, preferably lignite, until any moisture therein is driven off. The removal of the water and the other low boiling fractions renders the lignite porous. The acid sludge or pitch, or a mixture of the sludge or pitch, and a petroleum product, such as crude oil, or a residue thereof is then contacted with the lignite and the entire mass is heated to distillation temperature. It has been found preferably to charge a retort with the sludge or pitch, or a mixture of sludge and crude petroleum, and the porous lignite and then submit the mixture to distilling temperatures. Upon being subjected to heat the fluid forms a froth, but is prevented from boiling over by the presence of the porous material, which absorbs the minute globules of moisture in the emulsion and gives off the moisture in the form of vapor. The volatile constituents including water vapor, the hydrocarbon gases and vapors, and the sulphur dioxide are distilled off leaving the lignite impregnated with the heavy residue.

After the removal of the water and other low boiling fractions the distillation may be discontinued and the free oil drawn off leaving the lignite more or less impregnated with the bituminous residue. The bituminous residue instead of adhering to the bottom of the still in which the operation is being carried out, attaches itself to the particles of porous lignite filling the pores thereof and the mass may be easily removed from the still in a form suitable for use as a fuel. If desired the impregnated lignite may be ground up and moulded or pressed into briquettes adapted for convenient handling. It is unnecessary, however, to briquet the product as it is in suitable condition for use as fuel, as it comes from the retort or still.

Acid sludge is one of the cheapest materials obtainable because of the fact that it is more or less of a waste product in many refining plants, yet it has characteristics which readily commend it for this purpose. I have found that mixtures of acid sludge and the asphaltic crude petroleums of Mexico and California, or residuums thereof, either in equal parts or three parts of sludge to one part of petroleum, in combination with lignite, produce a very satisfactory fuel.

It is sometimes desirable to reduce the acid sludge to the form of pitch and to then contact the pitch with the lignite. In such cases the acid sludge is first heated sufficiently to drive off a major portion of its sulfur dioxid content and the lighter hydrocarbons so as to form a residue which has the constituency of pitch. This pitch is then contacted with the lignite and the mixture heated to distillation temperatures, whereupon volatile constituents are driven off and the lignite becomes impregnated with bitumen and when cool is suitable for use as a fuel.

As lignite is a relatively poor conductor of heat, it is advantageous, when treating it with bituminous material, to heat it in relatively thin layers, so that the heat may readily be diffused through the mass. Figures 1 and 2 show apparatus designed for this purpose.

A heating chamber 1 composed of any suitable refractory material contains a plurality of retorts 2 constructed of relatively small width so that the heat may penetrate to the interior of each. Any convenient means for heating the retorts may be employed but in the type of heating systems illustrated waste heat is utilized, the opening 3 being adapted for communication with any source of heat. The spent gases pass out of the heating chamber through the flue 4.

The heating chamber is provided with suitable means such as a baffle 5, so as to secure a circulation of the heat. This baffle protrudes between the several retorts and helps to support them. It extends for only a portion of the length of the chamber leaving the opening 6 through which the furnace gases pass to the upper portion of the heating chamber, the gases being deflected backward along the sides of the retorts and out through the flue 4. Each retort or still is provided with one or more charging inlets 7, and with a charging line 8 terminating in a spray pipe 9. A number of vapor lines 10 are provided for removing the vapors and gases generated.

In the operation of this apparatus the lignite and acid sludge material are admitted together through the charging inlets 7 and when the material has been treated for sufficient time the treated lignite is withdrawn through the outlet 11. If the acid sludge or mixture of sludge and oil is in condition to flow freely the lignite may first be placed in the retorts 2 and the sludge or mixture then introduced through the charging line 8 and spray pipe 9. As the operation proceeds the water and sulphur dioxide and other volatile matters are driven off through the vapor line 10 and the lignite becomes impregnated with the tarry residue.

It may be desired to carry on the process in a continuous manner. Fig. 3 and Fig. 4 illustrate a retort adapted for such a continuous process and designed to effect an economy in fuel cost through the utilization of waste heat.

The retort 21 is preferably constructed of earthenware. It is illustrated as constructed of fire clay blocks 22, which are preferably glazed so that they will not be affected by the acid in the sludge. Circle firebricks may be used to advantage for this purpose. The top and bottom may be constructed of earthen-ware reinforced by metal. The retort is preferably constructed of considerable length. It is contained in a heating chamber 23 provided with a conduit 24 in communication with a suitable source of heat and with an outlet flue 26.

A number of fire brick fingers 27 serve to hold the retort firmly in place and also act as baffles causing the heat passing up through the annular heating spaces 25 to circulate thoroughly around the retort. For charging the retort an air tight hopper 28 operated by any suitable mechanism as 29 is provided. The vapor line 30 is placed in the upper part of the retort to carry off any vapors formed. It may be made of earthen-ware if desired. The screw conveyor 31 serves to remove the treated material from the retort. A charging pipe 32 is used for charging liquid into the retort. It is advantageous to arrange a series or battery of these retorts with the heating chamber thereof in communication with the furnaces of a battery of boilers or stills so that the spent gases from the furnaces may pass readily through the conduit 24 to the retorts and thus the process may be carried on with a great fuel economy. If desired, a damper may be placed in the conduit 24 and the outlet 26 may be equipped with a fan or other suction means.

When impregnating lignite with a bituminous substance which is solid at ordinary temperatures the substances are generally admitted to the retort through the hopper 28 and when using a liquid bituminous substance it may be admitted through the pipe 32 and sprayed over the lignite which has already been admitted through the hopper. The water vapors and any hydrocarbon vapors are removed through the vapor line 30 and the spent porous material is removed by the conveyor 31. An outlet may be provided near the bottom of the retort for drawing off the waterfree oil.

What I claim is:

1. The process of treating lignite by subjecting it to sufficient heat to drive off its water content and render it porous, then mixing the dried lignite with acid sludge and finally distilling off the vaporizable constituents of the acid sludge to produce a fuel comprising lignite impregnated with the oily residue of the sludge.

2. The process of treating lignite which comprises, mixing the lignite with acid sludge and distilling off the vaporizable constituents of the sludge to produce a fuel comprising oil saturated but moisture free lignite.

3. The process of treating lignite which comprises, mixing the lignite with a mixture composed of substantially equal parts of acid sludge and crude petroleum and distilling off the vaporizable constituents of the mixture to produce a fuel comprising oil saturated but moisture free lignite.

4. The process of treating lignite which comprises, heating the lignite to drive off its water content and to render it porous, contacting a quantity of acid sludge with the porous lignite, and subjecting the mixture to distilling heat to remove the volatile constituents of the sludge and produce a fuel comprising oil saturated but moisture free lignite.

5. The process of treating lignite which comprises heating lignite in contact with a bituminous substance, whereby the pores of the lignite are freed of water and volatile hydrocarbons and are impregnated with the bituminous matter.

6. The herein described new article of manufacture comprising raw dehydrated lump lignite impregnated with a hydrocarbon oil, substantially as described.

In witness whereof I have hereunto set my hand this 1st day of October, 1923.

BENJAMIN GALLSWORTHY.